United States Patent [19]
Silander et al.

[11] Patent Number: 6,067,820
[45] Date of Patent: May 30, 2000

[54] PROCESS FOR THE HEAT-SOAK TREATMENT OF TEMPERED GLASS PANELS

[75] Inventors: Kai Silander, Tampere; Esko Lehto, Kangasala, both of Finland

[73] Assignee: Tamglass Ltd. Oy, Tampere, Finland

[21] Appl. No.: 09/063,275

[22] Filed: Apr. 21, 1998

[30] Foreign Application Priority Data

Apr. 21, 1997 [FI] Finland ..................... 971696

[51] Int. Cl.[7] .......................... C03B 27/00; C03B 25/00
[52] U.S. Cl. .................. 65/114; 65/119; 65/348
[58] Field of Search .................. 65/111, 114, 117, 65/118, 119, 348

[56] References Cited

U.S. PATENT DOCUMENTS

| | | | |
|---|---|---|---|
| 3,287,200 | 11/1966 | Hess et al. | 161/1 |
| 3,776,707 | 12/1973 | Inoue et al. | 65/114 |
| 4,233,048 | 11/1980 | Gintert | 65/348 |
| 4,913,720 | 4/1990 | Gardon et al. | 65/114 |
| 5,676,722 | 10/1997 | Seidel et al. | |

FOREIGN PATENT DOCUMENTS

96/01792  1/1996  WIPO .

*Primary Examiner*—Stanley S. Silverman
*Assistant Examiner*—Jacqueline A Ruller
*Attorney, Agent, or Firm*—Burns, Doane, Swecker & Mathis, L.L.P.

[57] ABSTRACT

The invention relates to a process for the heat-soak treatment of tempered glass panels. After tempering, the glass is heated or cooling of the glass is stopped for maintaining the temperature for the duration of e.g. a good minute within the range of 340–370° C., such that the glasses, which break spontaneously in time as a result of NiS-stones, can be broken already in a so-called heat-soak treatment. During the heating sequence or the cooling stop sequence and during the subsequent cooling sequence, the glass panel is carried in a horizontal plane, e.g. back and forth on rollers in an oscillating fashion. The process is a continuous-action process and the apparatus for implementing the same can be hooked up with a tempering machine for an on-line operation.

15 Claims, 3 Drawing Sheets

PROCESS FOR THE HEAT-SOAK TREATMENT OF TEMPERED GLASS PANELS

The present invention relates to a process for the heat-soak treatment of tempered glass panels, in which process the glass panel is allowed to cool from the tempering temperature to a temperature below 379° C., most preferably to about 300° C., whereafter the glass panel is heated to the range of 350–360° C. and cooled again.

Alternatively, the invention relates to a process for the heat-soak treatment of tempered glass panels, in which process the cooling sequence of a cooling glass panel emerging from temper is temporarily stopped at a given temperature, as described hereinafter in more detail.

The so-called heat-soak process is based on the following known principles:

1. The NiS-stones appearing in glass at 379° C. or higher are always in a stable alpha-form.
2. When glass cools to below 379° C., this stabile alpha-form becomes unstable and begins to convert as a function of time and temperature all the way to a beta-form.
3. The conversion brings forth a stone volume growth of 2.38%. This volume change results in a tensile stress around the stone.
4. If this tensile stress lies within the tensile stress range of tempered glass and the tensile stress developed around the stone surpasses the tensile strength of glass, the glass will explode into fragments.
5. It has been stated as a fundamental piece of information that the conversion from an alpha-form into a beta-form takes about 1 minute with glass having a temperature of 350° C. and about 7 months with glass having a temperature of 80° C. and 5,7 years with glass having a temperature of 30° C.

The thermal treatment known as a heat-soak process is used for prebreaking those glasses which, for the above reason, would spontaneously break in use within a few years.

The currently known heat-soak processes are batch type processes. A rather large number of tempered glasses (e.g. 3000 kg) are held in a heating chamber at a temperature of e.g. 280–300° C. for several hours, e.g. 8 hours. This prior known process is slow and requires laborious handling of batch loads.

The published application WO 9601792 discloses a process, wherein the heat-soak thermal treatment is carried out at a temperature of above 300° C. for at least two hours, followed by another tempering process for eliminating a drop in the degree of temper caused by the heat-soak process. A draw-back also in this method is a relatively long heat-soak process and also a necessary second tempering process.

An object of the invention is to provide a novel type of heat-soak process, which is expedient and, if desired, can be hooked in on-line operation with a tempering machine.

This object is achieved by means of the invention on the basis of the characterizing features set forth in the appended claim 1 or alternatively in claim 2.

The invention is based on the discovery that, at a relatively high temperature (340–370° C.), the time needed for a reasonably effective heat-soak process is sufficiently short (from one minute to a few minutes, depending on glass thickness), such that there is no time for the degree of temper to fall significantly.

The non-independent claims disclose preferred embodiments of the invention.

The invention will now be described in more detail with reference made to the accompanying drawings, in which FIG. 1 shows an apparatus for implementing a process of the invention, in a schematic vertical section;

Figure 1:
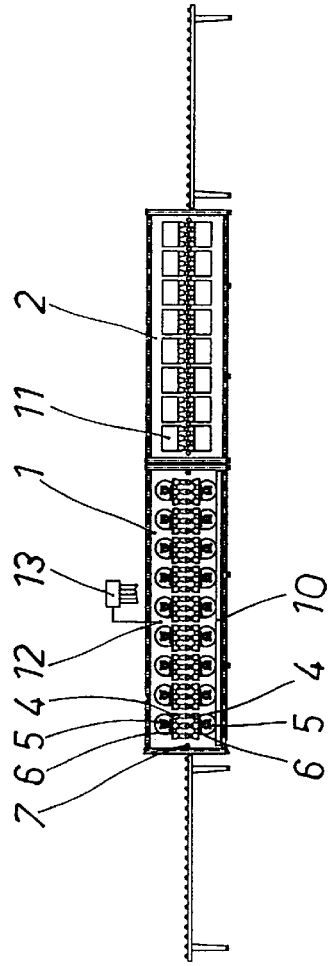
FIG. 1A shows a portion of FIG. 1 in a larger scale.
Figure 3:
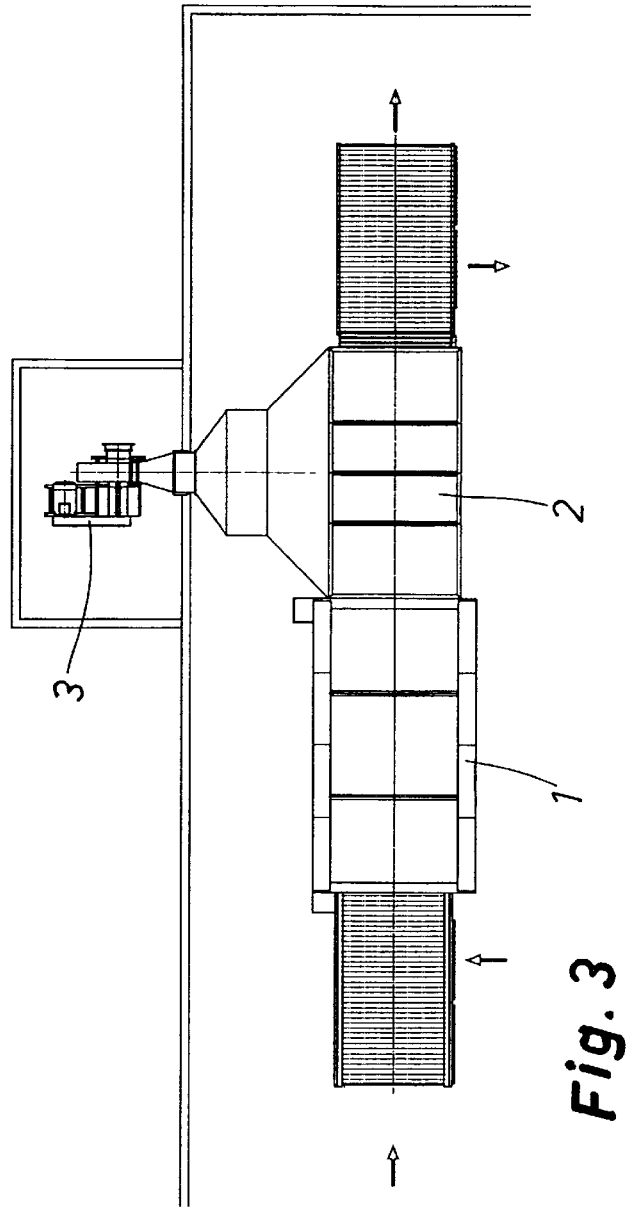
FIG. 2 shows schematically a detail in a heating section included in the apparatus and FIG. 3 shows an apparatus for implementing the process, in a schematic plan view.
Figure 1A:
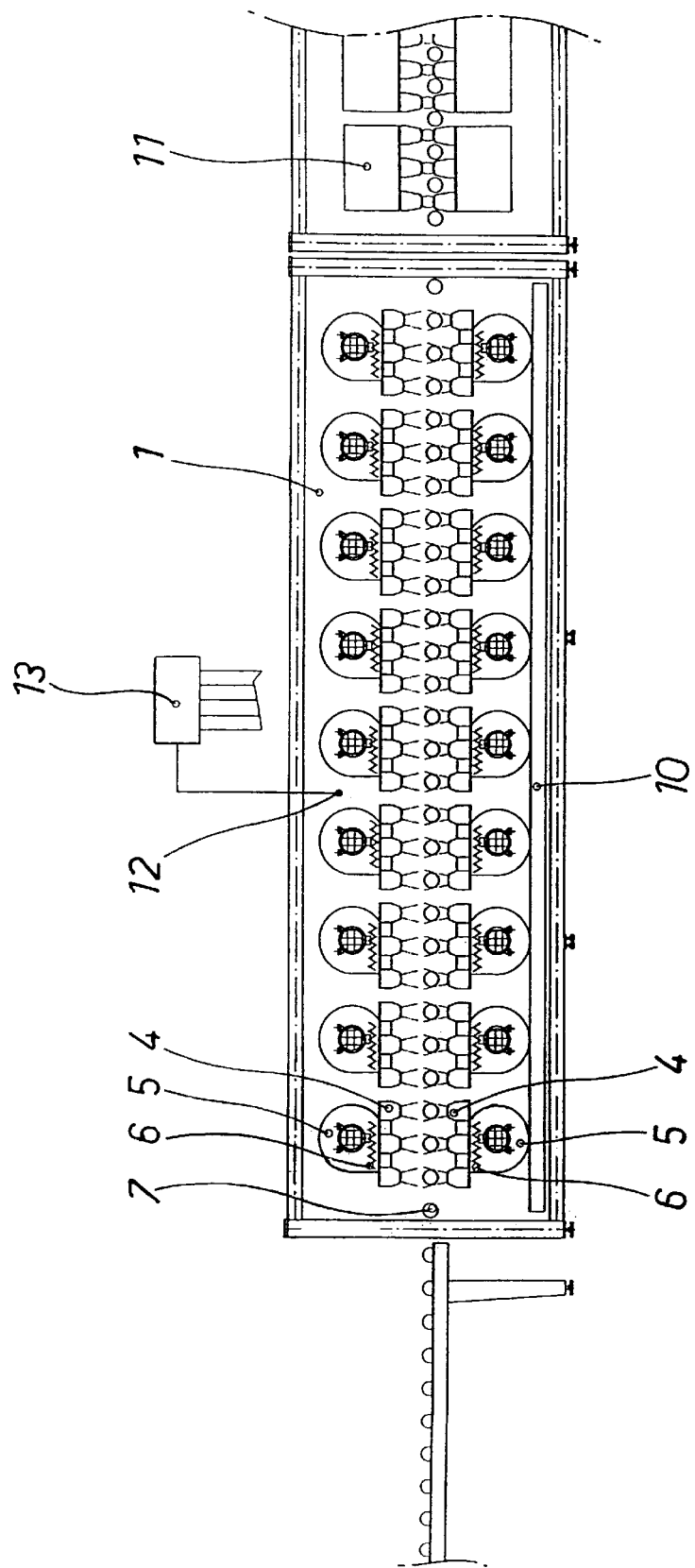
Figure 2:
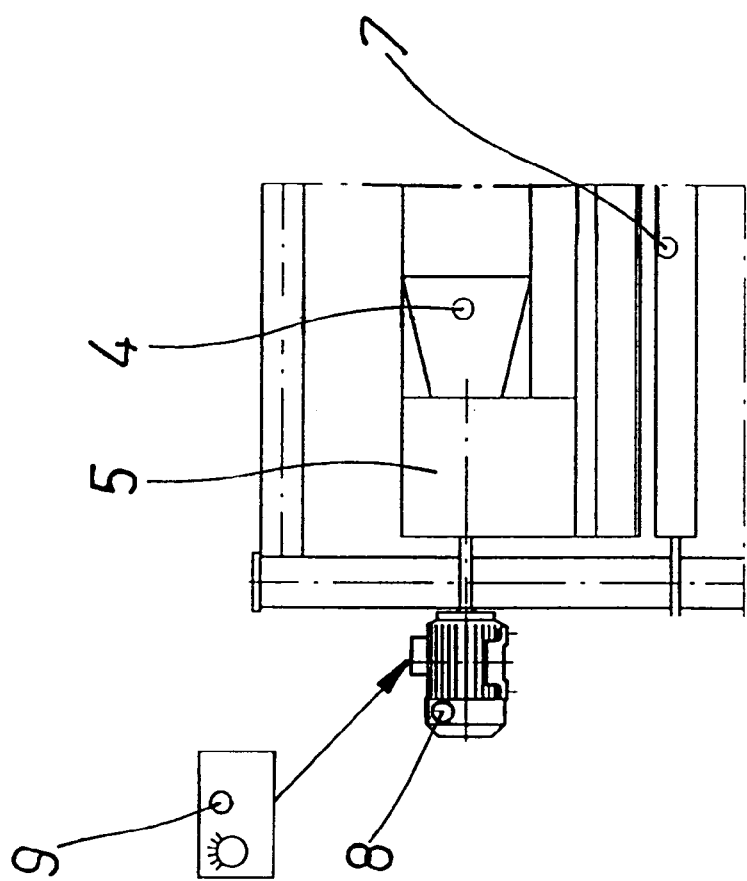

The apparatus for implementing the process includes a furnace 1 operating on convection principle and a cooling section 2, into which a blower 3 supplies cooling air.

Above and below a conveyor constituted by rollers 7, the heating furnace 1 includes nozzle boxes 4 provided with blowers 5 for circulating hot air between the furnace interior and nozzles or orifices existing near the surface of a glass panel. The nozzle boxes 4 are provided with heating resistances 6 between the blower 5 and the nozzle orifices. A temperature sensor 12 measuring the temperature of the air in the furnace 1 regulates the effect supplied to the resistances 6, such that the furnace air maintains its temperature at a desired set value. This temperature is typically about 300–400° C. and the tempered glass arriving in the furnace has a temperature which is substantially below 379° C. According to a first alternative of the invention, the glass arriving in the heat-soak furnace 1 has a temperature of about 300° C., the glass panel heating in the furnace to about 350–360° C. According to a second alternative of the invention, the cooling of a glass emerging from temper is stopped e.g. for the duration of a good minute by means of hot-air blasting in the furnace 1 for maintaining the glass at a temperature of 340–370° C., most preferably at a temperature of about 350–360° C. Thus, the air blasted by the blowers 5 is heated to a matching temperature.

The heating effect can be controlled not only by regulating the output of the heating resistances 6 but also by regulating the rotating speed of the blowers 5, the coefficient of heat transfer of convection blasting changing accordingly. The regulation can be implemented in such a way that the inverter drive of blower motors 8 controls automatically the rotating speed of the blowers. A regulator 9 can be used e.g. for setting the rotating speeds adjusted for various glass thicknesses. If desired, the regulation can also be implemented in such a way that the rotating speed rises automatically during a control sequence, as described in the Applicant's patent FI 86764.

After maintaining the glass at a temperature of 350–360° C. for the duration of at least one minute (in case of thicker, 6–8 mm glasses, a few minutes), the glass is carried into a cooling section 2, wherein nozzle boxes 11 mounted above and below a roller conveyor are used for blasting cooling air to both surfaces of the glass.

In the furnace 1, the lower nozzle boxes are located directly below the rollers for leaving therebetween vertically clear gaps for dropping broken glasses therethrough onto a conveyor 10, which carries the glass fragments and crumbs out of the furnace 1.

Said conversion from alpha-form to beta-form occurs in the furnace 1 in a very high probability (in a probability of at least about 90%). The glasses, in which this conversion has occurred, explode to fragments during a temperature equalizing period sustained in the furnace 1 as the temperature is within the range of 340–370° C., most preferably within the range of 350–360° C. In practice, the glass panels can be cooled within the section 2 to a suitable handling temperature, e.g. below 100° C., prior to passing the same onto a discharge conveyor.

A process of the invention can be carried out with a separate machine or with a machine, constructed as a direct extension to a tempering machine and operating on the on-line principle, such that the glass panels progress through the heat-soak process essentially in the same time as through the tempering machine. This facilitates and expedites essentially the handling of tempered glasses.

In order to achieve a necessary treatment period in the section 1, the glass panels are maneuvered within the sections 1 and 2 back and forth, i.e. in an oscillating motion. If the process period required in the heat-soak machines is substantially longer than that of the tempering machines (e.g. if a very high probability of conversion is desired), it is possible to construct two heat-soak machines in parallel as an extension to a single tempering machine, the continuous action being provided by diverging the glass panels emerging from the tempering machine alternately to different heat-soak machines. The same result can be achieved by charging and discharging a single longer heat-soak furnace multi-sequentially, whereby said furnace contains two or more not coincidental loads.

We claim:

1. A process for the heat-soak treatment of tempered glass panels, comprising temporarily stopping a cooling process of a cooling glass emerging from temper by way of hot-air blasting effected in a furnace for maintaining the glass at a temperature of 340–370° C.

2. A process as set forth in claim 1, wherein a duration of the temporary stopping of said cooling process is about one minute.

3. A process as set forth in claim 1, wherein the temporary stopping of the cooling process is carried out with convection blowers so that air blasted by the convection blowers is heated to a temperature of 340–370° C.

4. A process as set forth in claim 1, wherein an effect of the temporary stopping of the cooling is controlled by regulating at least one of the blasting power of the hot-air blasting and a heating effect of the hot air.

5. A process as set forth in claim 3, wherein the air blasted by the convection blowers is heated to a temperature of 350–360° C.

6. A process as set forth in claim 1, wherein the glass is cooled by air blasting immediately after the temporary stopping of the cooling process.

7. A process as set forth in claim 1, wherein the cooling process of the cooling glass is temporarily stopped to maintain the glass at a temperature of about 350–360° C.

8. A process for the heat-soak treatment of tempered glass panels comprising:

allowing a glass panel which is at a tempering temperature to cool from the tempering temperature to a temperature below 379° C.;

heating and re-cooling the glass panel again, the heating of the glass panel being performed in a furnace having lower heating air boxes and carried out to maintain the glass sheet at a temperature of 340–370° C.;

advancing the glass panel in a horizontal plane during said heating and re-cooling with at least one of the heating and the re-cooling being carried out by using forced convection; and collecting glass fragments broken during heating onto a conveyor that is set below the lower heating air boxes of the furnace and carrying away the glass fragments.

9. A process for the heat-soak treatment of tempered glass panels comprising:

temporarily stopping a cooling process of a cooling glass emerging from temper by way of hot-air blasting effected in a furnace having lower heating air boxes for maintaining the glass at a temperature of 340–370° C.; and collecting glass fragments broken during heating onto a conveyor that is set below the lower heating air boxes of the furnace and carrying away the glass fragments.

10. A process as set forth in claim 9, wherein a duration of the temporary stopping of said cooling process is about one minute.

11. A process as set forth in claim 8, wherein the heating is carried out with convection blowers so that air blasted by the convection blowers is heated to a temperature of above 380° C.

12. A process as set forth in claim 9, wherein the temporary stopping of the cooling process is carried out with convection blowers so that air blasted by the convection blowers is heated to a temperature of 340–370° C.

13. A process as set forth in claim 12, wherein the air blasted by the convection blowers is heated to a temperature of 350–360° C.

14. A process as set forth in claim 11, wherein the air blasted by the convection blowers is heated to a temperature of about 400° C.

15. A process as set forth in claim 9, wherein the cooling process of the cooling glass is temporarily stopped to maintain the glass at a temperature of about 350–360° C.

* * * * *